(12) United States Patent
Hsu

(10) Patent No.: US 6,810,793 B1
(45) Date of Patent: Nov. 2, 2004

(54) ROTISSERIE WITH LIGHTING FIXTURE

(76) Inventor: Huang-Hsi Hsu, 8F, No. 14, Lane 252, Chungshan N. Rd., Sec. 6, Taipei (TW)

( * ) Notice: Subject to any disclaimer, the term of this patent is extended or adjusted under 35 U.S.C. 154(b) by 0 days.

(21) Appl. No.: 10/619,417

(22) Filed: Jul. 16, 2003

(30) Foreign Application Priority Data

May 2, 2003 (TW) .......................................... 092208077

(51) Int. Cl.⁷ .............................. A23L 1/00; A47J 37/00; A47J 37/04
(52) U.S. Cl. .......................... 99/341; 99/419; 99/421 H
(58) Field of Search ............... 99/339, 340, 419–421 V, 99/400, 401, 444–450, 481, 482, 341; 219/400, 401; 126/25 R, 9 R, 41 R; 426/523, 466, 520

(56) References Cited

U.S. PATENT DOCUMENTS

| | | | | |
|---|---|---|---|---|
| 2,654,307 A | * | 10/1953 | Nisenson | 99/421 H |
| 3,733,999 A | * | 5/1973 | Bernstein | 99/337 |
| 5,598,769 A | * | 2/1997 | Luebke et al. | 99/395 |
| 5,632,098 A | * | 5/1997 | Finch | 34/63 |
| 5,649,475 A | * | 7/1997 | Murphy et al. | 99/421 H |
| 5,655,437 A | * | 8/1997 | Vitacca | 99/400 |
| 5,801,357 A | * | 9/1998 | Danen | 219/403 |
| 5,934,180 A | * | 8/1999 | Lin | 99/340 |
| 6,131,505 A | * | 10/2000 | Lin | 99/340 |
| 6,330,853 B1 | * | 12/2001 | Yu | 99/421 H |

* cited by examiner

Primary Examiner—Timothy F. Simone
(74) Attorney, Agent, or Firm—Bacon & Thomas

(57) ABSTRACT

A rotisserie is disclosed to include a housing, a rotary motor drive provided at one side of the housing and adapted to rotate a rod member and the meat on the rod member for roasting, and a lighting fixture mounted on the motor case of the rotary motor drive and adapted to illuminate the meat under roasting when dark.

10 Claims, 4 Drawing Sheets

ROTISSERIE WITH LIGHTING FIXTURE

BACKGROUND OF THE INVENTION

1. Field of the Invention

The present invention relates to a rotisserie and, more specifically, to such a rotisserie, which is equipped with a lighting fixture.

2. Description of the Related Art

Following the development of the present era, people care more about the taste and style of personal recreational life. Therefore, the activity of barbecue that fits all members of every family and their relatives and friends has become more and more popularly accepted. Various barbecue grills and the like have been commercialized. However, these apparatus are commonly simple in shape, neither humanized nor practical in use. When selecting a grill from two similar products having a reasonable price, humanization and practical use are the key points to consider. In order to survive in the competitive market, barbecue apparatus manufacturers must try hard to improve their products in humanization and practical use. Without humanization and practical use, one's barbecue products will be defeated in the free market.

FIG. 1 shows a prior art rotisserie available in the market. According to this design, the rotisserie 10 comprises a housing 11 defining a cooking chamber 111 for holding cooking implements such as burners, cooking grid, coals (not shown). The housing 11 comprises a first rack 12 and a second rack 13 at two opposite sides of the cooking chamber 111. The first rack 12 comprises a flat mounting frame 121 and a top notch 124. The mounting frame 121 has a plurality of through holes 122 for the mounting of screws 123 to fix the first rack 12 to the housing 11. The second rack 13 is a zigzag plate member having a vertically extended top bearing wall 133, a vertically extended bottom mounting wall 132, and a middle connecting wall 131 horizontally connected between the vertically extended top bearing wall 133 and the vertically extended bottom mounting wall 132. The bottom mounting wall 132 has a plurality of through holes 134 for the mounting of screws 135 to fix the second rack 13 to the housing 11 opposite to the first rack 12. The top bearing wall 133 has a top notch 136 disposed above the housing 11 corresponding to the top notch 124 of the first rack 12.

The rotisserie further comprises a motor case 14 fastened to the top bearing wall 133 of the second rack 13 to hold a reversible motor (not shown) on the inside. The motor case 14 comprises two coupling elements 141 bilaterally located on the back wall thereof and respectively coupled to the top bearing wall 133 of the second rack 13 and stopped at the connection area between the top bearing wall 133 and the middle connecting wall 131 to secure the motor case 14 to the second rack 13, and an axle hole 142 in the back wall between the coupling elements 141 corresponding to the top notch 136 of the second rack 13. The rotisserie also comprises a rod member 15 supported in the top notch 124 of the first rack 12 and the top notch 136 of the second notch 13 and inserted through the axle hole 142 and axially coupled to the output shaft of the motor inside the motor case 14. The rod member comprises two movable forks 151 adapted to hold the food to be roasted. Further, a power cord 143 extends to the outside of the motor case 14 for connection to external power source.

The aforesaid rotisserie is functional, however it still has drawbacks. When roasting meat in the housing 11 of the rotisserie 10 in the daylight or under sufficient illumination, the user can check the roasting status of the meat with the eyes, and know accurately when the meat is well done. However, when roasting meat in the dark, the user may not be able to see the roasting status of the meat well, and have to cut a small piece of the meat under roasting and then eat the cut piece so as to inspect the roasting status of the meat. It is not hygienic to examine the roasting status of the meat in this way because the user may eat not well-cooked food. It is harmful to the user when the user ate food that is not well cooked. Therefore, this conventional rotisserie is not perfect in design, not humanized, and not practical in use. Improvements on this design are necessary.

Therefore, it is desirable to provide a humanized and practical rotisserie that enables the user to visually check the roasting status of the food.

SUMMARY OF THE INVENTION

The present invention has been accomplished under the circumstances in view. It is one object of the present invention to provide a rotisserie, which is equipped with a lighting fixture for providing illumination when cooking in the dark. It is another object of the present invention to provide a rotisserie, which has a power jack for power output.

According to one aspect of the present invention, the rotisserie comprising a housing defining a cooking chamber, a rod member adapted to hold food in the cooking chamber for roasting, and a rotary motor drive provided at one side of the housing and adapted to rotate the rod member in the cooking chamber, wherein the rotary motor drive comprises: a motor case holding a motor, the motor case having an axle hole into which the rod member is inserted and coupled to the motor; coupling means adapted to secure the motor case to one side of the housing; and a lighting fixture mounted on the motor case and adapted to illuminate the cooking chamber. According to another aspect of the present invention, a power jack is provided at the motor case and electrically connected to the power cord of the motor case for power output.

DETAILED DESCRIPTION OF THE PREFERRED EMBODIMENT

Figure 1:
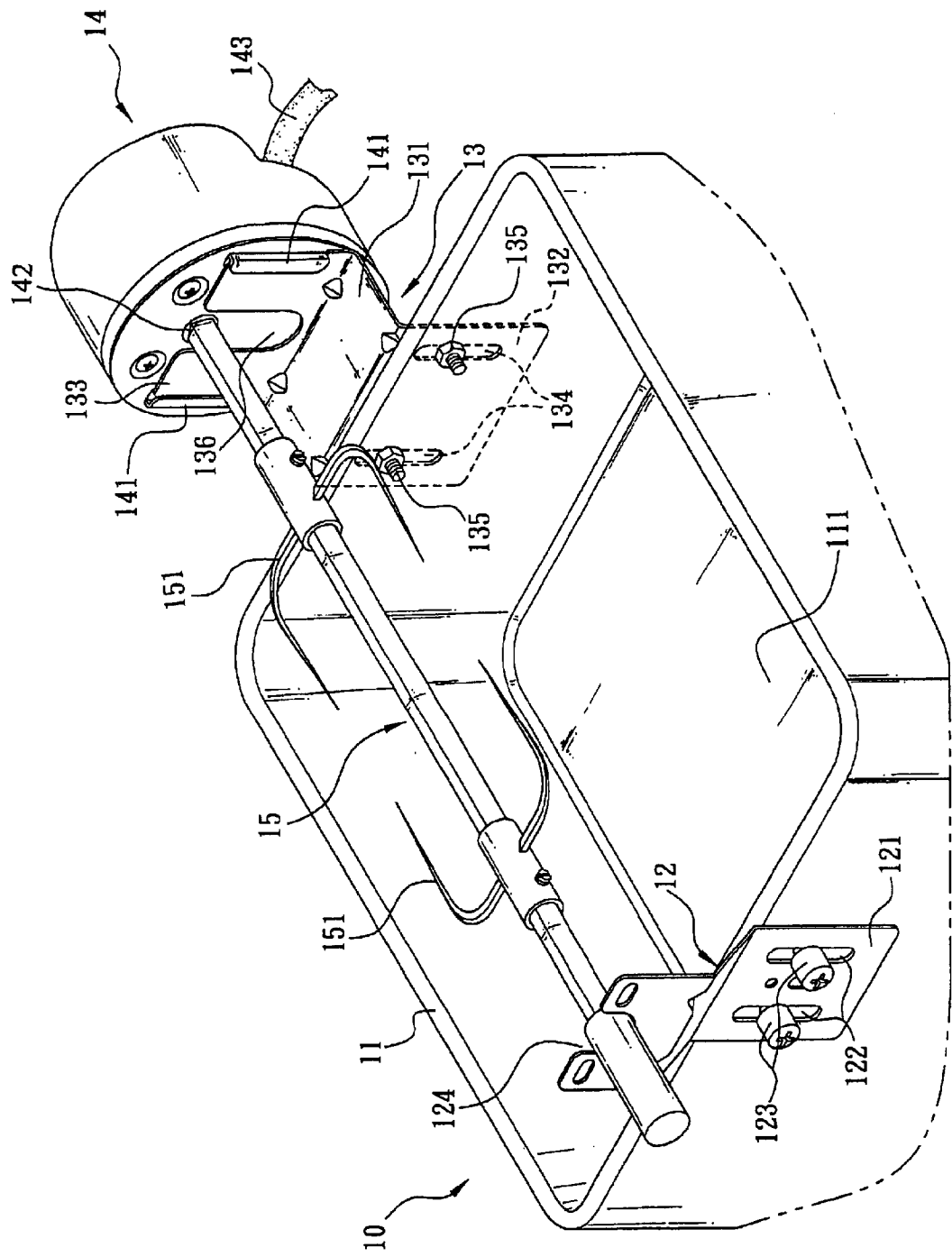
FIG. 1 is an elevational view of a rotisserie according to the prior art.
Figure 2:
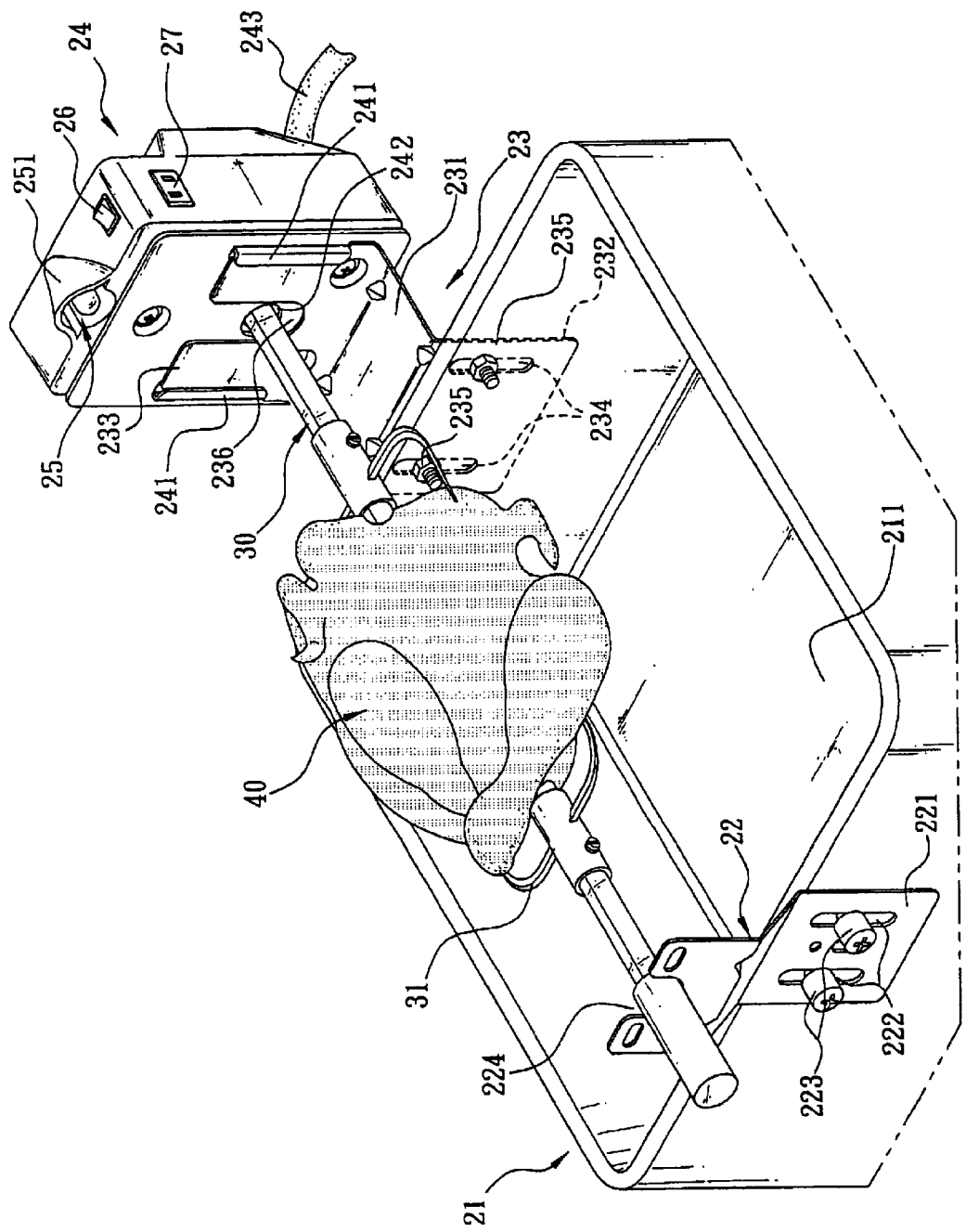
FIG. 2 is an elevational view of a rotisserie according to a first embodiment of the present invention.

Referring to FIG. 2, a rotisserie is shown comprising a housing 21 defining a cooking chamber 211 for holding cooking implements such as burners, cooking grid, coals (not shown). The housing 21 comprises a first rack 22 and a second rack 23 at two opposite sides of the cooking chamber 211. The first rack 22 comprises a flat mounting frame 221 and a top notch 224. The mounting frame 221 has a plurality of through holes 222 for the mounting of screws 223 to fix the first rack 22 to the housing 21.

The second rack 23 is a zigzag plate member having a vertically extended top bearing wall 233, a vertically extended bottom mounting wall 232, and a middle connecting wall 231 horizontally connected between the vertically extended top bearing wall 233 and the vertically extended bottom mounting wall 232. The bottom mounting wall 232 has a plurality of through holes 234 for the mounting of screws 235 to fix the second rack 23 to the housing 21 opposite to the first rack 22. The top bearing wall 233 has a top notch 236 disposed above the housing 21 corresponding to the top notch 224 of the first rack 22.

A motor case 24 is fastened to the top bearing wall 233 of the second rack 23 to hold a reversible motor (not shown) on the inside. The motor case 24 comprises two coupling elements 241 bilaterally located on the back wall thereof and respectively coupled to the top bearing wall 233 of the second rack 23 and stopped at the connection area between the top bearing wall 233 and the middle connecting wall 231 to secure the motor case 24 to the second rack 23, and an axle hole 242 in the back wall between the coupling elements 241corresponding to the output shaft 245 (not shown) of the reversible motor inside the motor case 24 and the top notch 236 of the second rack 23.

A lighting fixture 25 is provided at the motor case 24. As illustrated in FIG. 2, the lighting fixture 25 comprises a lampshade 251formed integral with the top wall of the motor case 24. At least one switch 26 is installed in the motor case 24 for controlling the operation of the lighting fixture 25 and/or the motor inside the motor case 24. When roasting meat or the like in the cooking chamber 211 in the dark, the user can switch on the switch 26 to turn on the lighting fixture 25. Under sufficient illumination, the user can see the cooking status of the roasting meat. Further, a power cord 243 extends out of the motor case 24 for connection to external power source to obtain the necessary working voltage to the motor inside the motor case 24 and the lighting fixture 25.

The rotisserie further comprises a rod member 30 supported in the top notch 224 of the first rack 22 and the top notch 236 of the second notch 23 and inserted into the axle hole 242 and axially coupled to the output shaft of the motor inside the motor case 24. Two forks 31 are horizontally mounted on the rod member 30 to face each other for holding the food 40 to be roasted. The forks 31 can be moved axially along the rod member 30 relative to each other subject to the size of the food 40 to be roasted. However, the forks 31 are prohibited from rotary motion relative to the rod member 30 (prohibiting the forks 31 from rotary motion relative to the rod member 30 can easily be achieved by conventional techniques, for example, the use of holding down screws).

As indicated above, when roasting food 40 in the housing 21 in the dark, the lighting fixture 25 can be turned on to illuminate the cooking area so that the user can conveniently visually check the cooking status of the food 40.

Figure 3:
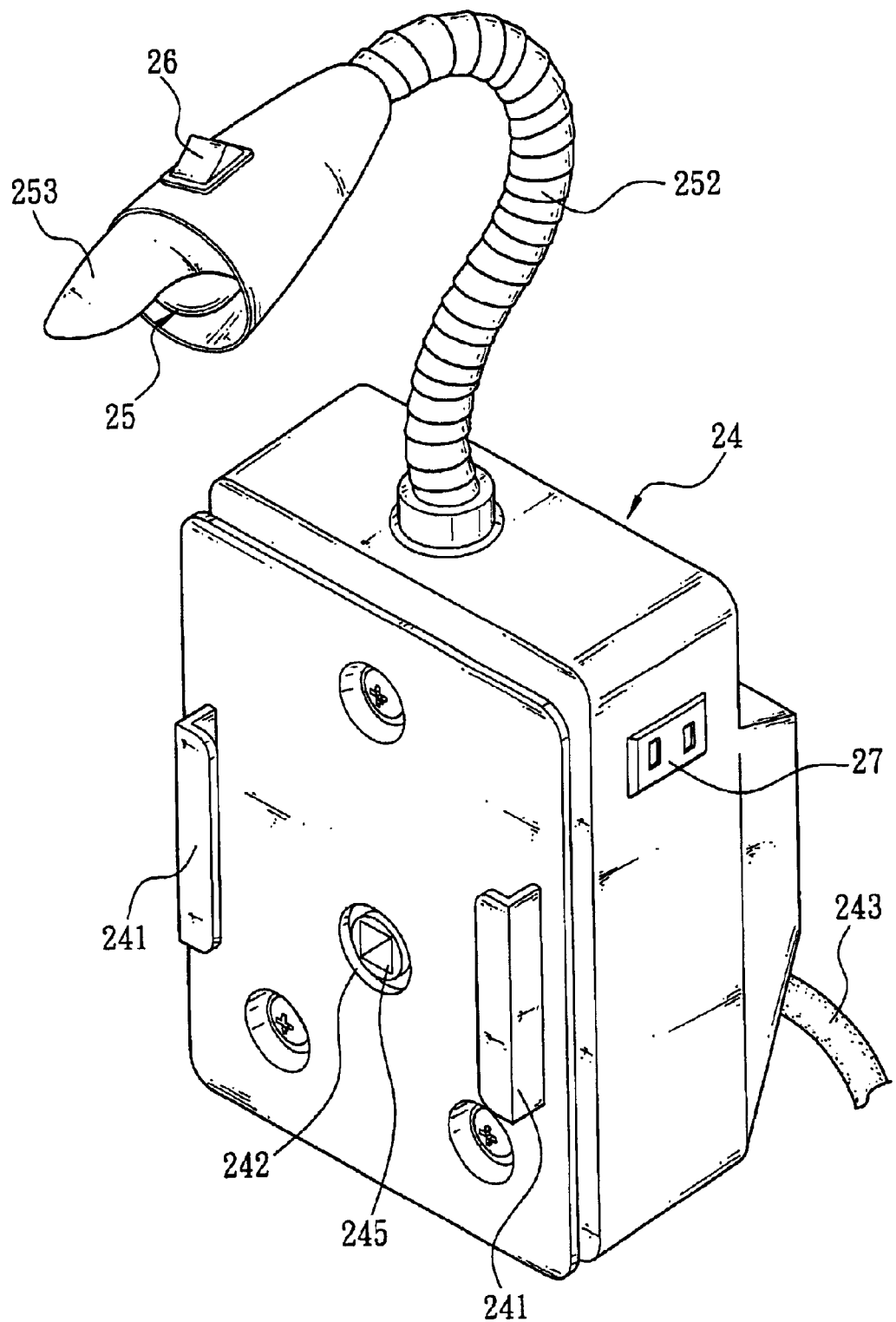
FIG. 3 is an elevational view of a rotisserie according to a second embodiment of the present invention.
Figure 4:
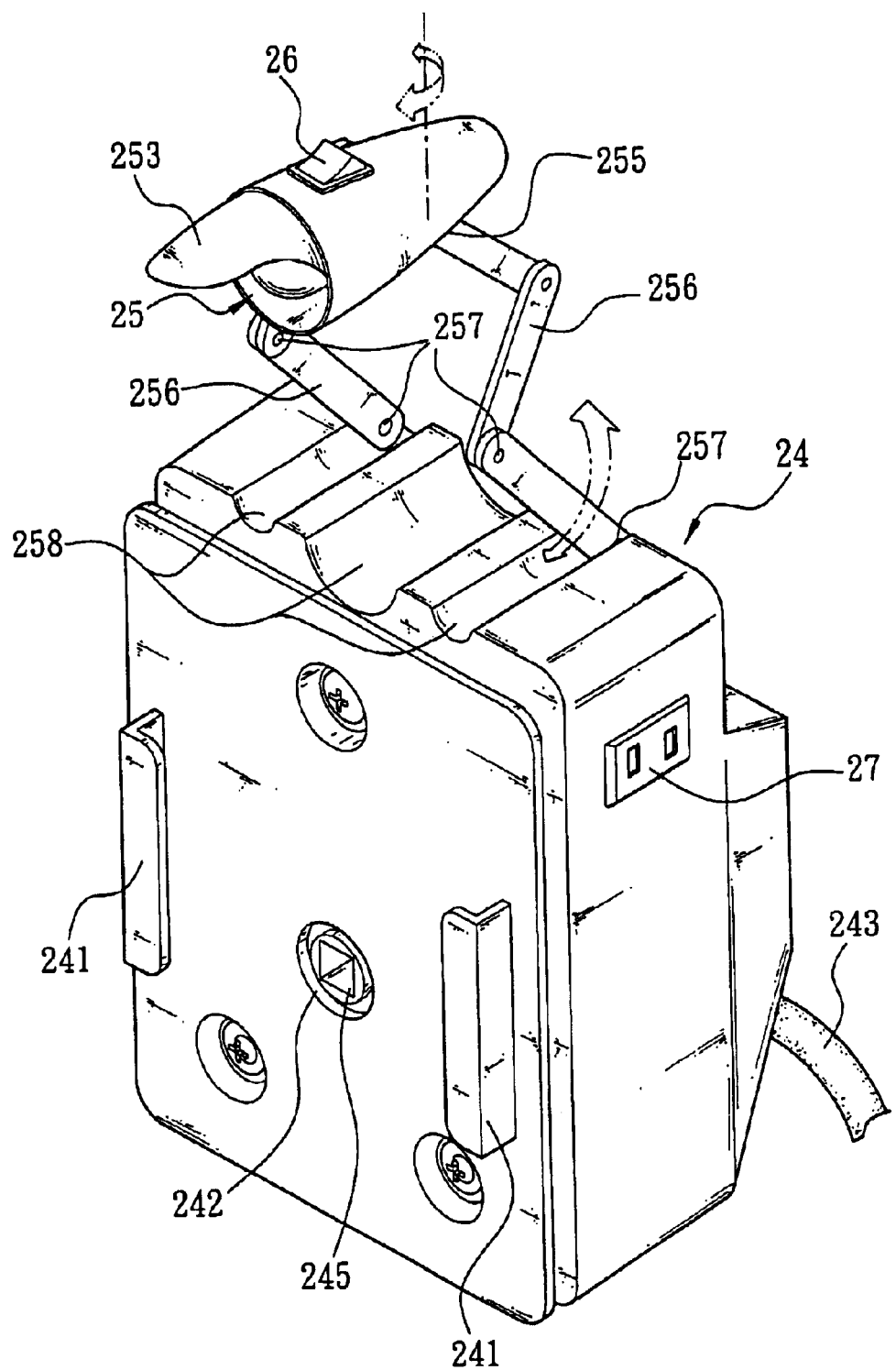
FIG. 4 is an elevational view of a rotisserie according to a third embodiment of the present invention.

Referring to FIGS. 3 and 4, except the aforesaid coupling elements 241, axle hole 242, power cord 243 and output shaft 245 on the motor case 24, the aforesaid lighting fixture 25 may be variously embodied. FIG. 3 shows an alternate form of the lighting fixture 25. According to this embodiment, the lighting fixture 25 comprises a bellows support tube 252 (formed of a flexible insulating tube and a metal coil around the insulating tube) upwardly extended from the top side of the motor case 24, and a lampshade 253 at the end of the bellows support tube 252. Further, the switch 26 is installed in the lampshade 253.

FIG. 4 shows another alternate form of the present invention. According to this embodiment, the lampshade 253 of the lighting fixture 25 is pivoted to the top pivot end 255 of a folding support 256, which is pivoted to the top side of the motor case 24. The folding support 256 has joints 257 through which the user can bend the folding support 256 to adjust the elevation and angle of the lighting fixture 25. Further, the motor case 24 has a recessed receiving portion 258 in the top side for the resting of the lighting fixture 25 when the folding support 256 collapsed.

Referring to FIGS. 2~4 again, a power jack 27 is provided at one side of the motor case 24 for power output. The user can cannot a portable electric apparatus to the power jack 27 to obtain the necessary electricity.

A prototype of rotisserie with lighting fixture has been constructed with the features of FIGS. 2~4. The rotisserie with lighting fixture functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A rotisserie comprising a housing defining a cooking chamber, a rod member adapted to hold food in said cooking chamber for roasting, and a rotary motor drive provided at one side of said housing and adapted to rotate said rod member in said cooking chamber, wherein said rotary motor drive comprises:

a motor case holding a motor, said motor case having an axle hole into which said rod member is inserted and coupled to said motor;

coupling means adapted to secure said motor case to one side of said housing;

a lighting fixture mounted on said motor case and adapted to illuminate said cooking chamber; and wherein said lighting fixture comprises a bellows support tube, said bellows support tube having a bottom end fixedly fastened to said motor case and a top end, and a lampshade fastened to the top end of said bellows support tube.

2. The rotisserie as claimed in claim 1, wherein said motor case comprises a power cord adapted to obtain external power supply for said motor and said lighting fixture.

3. The rotisserie as claimed in claim 1, wherein said motor case has a power jack electrically connected to said power cord for power output.

4. The rotisserie as claimed in claim 3, wherein said motor case comprises switch means adapted to control the operation of said motor and said lighting fixture, said light fixture comprises a lampshade.

5. The rotisserie as claimed in claim 1, wherein said housing comprises a first rack disposed at a first side thereof and a second rack disposed at a second side thereof opposite to said first rack and adapted to support with said first rack said rod member; said coupling means couples said motor case to the second rack of said housing.

6. A rotisserie comprising a housing defining a cooking chamber, a rod member adapted to hold food in said cooking chamber for roasting, and a rotary motor drive provided at one side of said housing and adapted to rotate said rod member in said cooking chamber, wherein said rotary motor drive comprises:

a motor case holding a motor, said motor case having an axle hole into which said rod member is inserted and coupled to said motor;

coupling means adapted to secure said motor case to one side of said housing;

a lighting fixture mounted on said motor case and adapted to illuminate said cooking chamber; and a lighting fixture comprises a folding support, said folding support having a bottom end pivoted to said motor case, a top end, and a plurality of joints between said top end and said bottom end, a lampshade pivoted to the top end of said folding support, and an on/off switch mounted in said lampshade; said motor case has a recessed receiving portion in a top side thereof adapted to accommodate said lampshade when said folding support collapsed.

7. The rotisserie as claimed in claim 6, wherein said motor case comprises a power cord adapted to obtain external power supply for said motor and said lighting fixture.

8. The rotisserie as claimed in claim 6, wherein said motor case has a power jack electrically connected to said power cord for power output.

9. The rotisserie as claimed in claim 6, wherein said housing comprises a first rack disposed at a first side thereof and a second rack disposed at a second side thereof opposite to said first rack and adapted to support with said first rack said rod member; said coupling means couples said motor case to the second rack of said housing.

10. The rotisserie as claimed in claim 6, wherein said motor case comprises switch means adapted to control the operation of said motor and said lighting fixture, said light fixture comprises a lampshade.

\* \* \* \* \*

(12) EX PARTE REEXAMINATION CERTIFICATE (5885th)
United States Patent
Hsu

(10) Number: US 6,810,793 C1
(45) Certificate Issued: Sep. 4, 2007

(54) ROTISSERIE WITH LIGHTING FIXTURE

(76) Inventor: Huang-Hsi Hsu, 8F, No. 14, Lane 252, Chungshan N. Rd., Sec. 6, Taipei (TW)

Reexamination Request:
No. 90/007,391, Jan. 25, 2005

Reexamination Certificate for:
Patent No.: 6,810,793
Issued: Nov. 2, 2004
Appl. No.: 10/619,417
Filed: Jul. 16, 2003

(30) Foreign Application Priority Data

May 2, 2003 (TW) ............................. 92208077

(51) Int. Cl.
*A47J 37/04* (2006.01)

(52) U.S. Cl. ..................... 99/341; 99/419; 99/421 H

(58) Field of Classification Search ................ None
See application file for complete search history.

(56) References Cited

U.S. PATENT DOCUMENTS

| D261,469 S | 10/1981 | Koziol |
| D261,470 S | 10/1981 | Koziol |
| D261,471 S | 10/1981 | Koziol |
| 4,924,766 A | 5/1990 | Hitch |
| 5,664,875 A | 9/1997 | Hegedus |
| D491,415 S | 6/2004 | Rummel et al. |

*Primary Examiner*—Kiley Stoner

(57) ABSTRACT

A rotisserie is disclosed to include a housing, a rotary motor drive provided at one side of the housing and adapted to rotate a rod member and the meat on the rod member for roasting, and a lighting fixture mounted on the motor case of the rotary motor drive and adapted to illuminate the meat under roasting when dark.

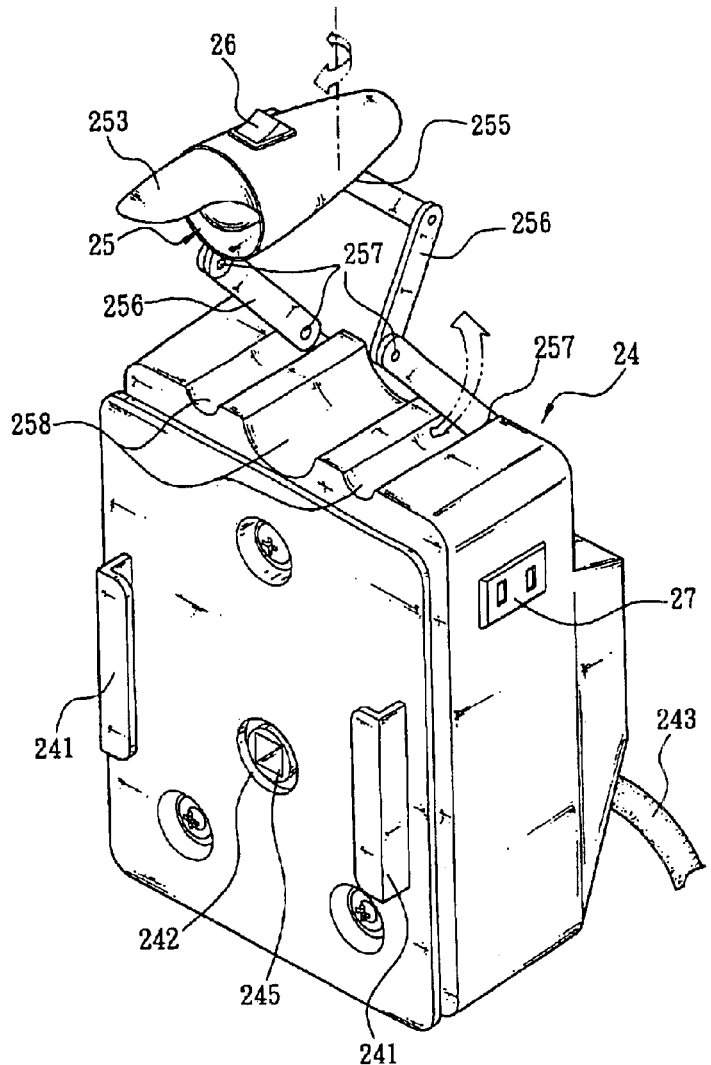

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6–10 is confirmed.

Claims 1–5 are cancelled.

* * * * *